Figure 1:
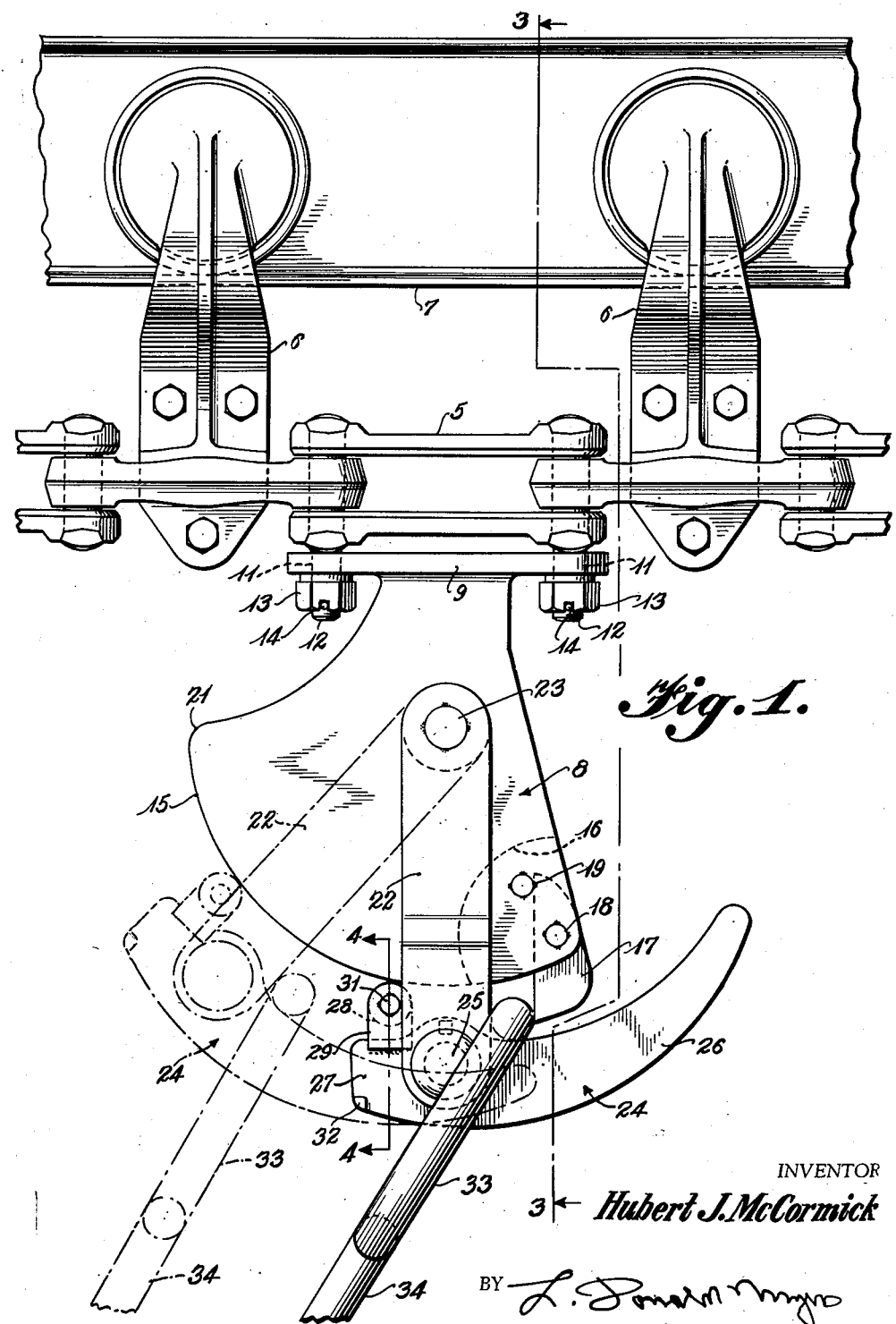

July 7, 1953 — H. J. McCORMICK — 2,644,407
QUICK-RELEASE OVERHEAD TROLLEY CONVEYER HOOK
Filed Aug. 10, 1950 — 2 Sheets-Sheet 1

INVENTOR
Hubert J. McCormick
BY
ATTORNEY

July 7, 1953 H. J. McCORMICK 2,644,407
QUICK-RELEASE OVERHEAD TROLLEY CONVEYER HOOK
Filed Aug. 10, 1950 2 Sheets-Sheet 2
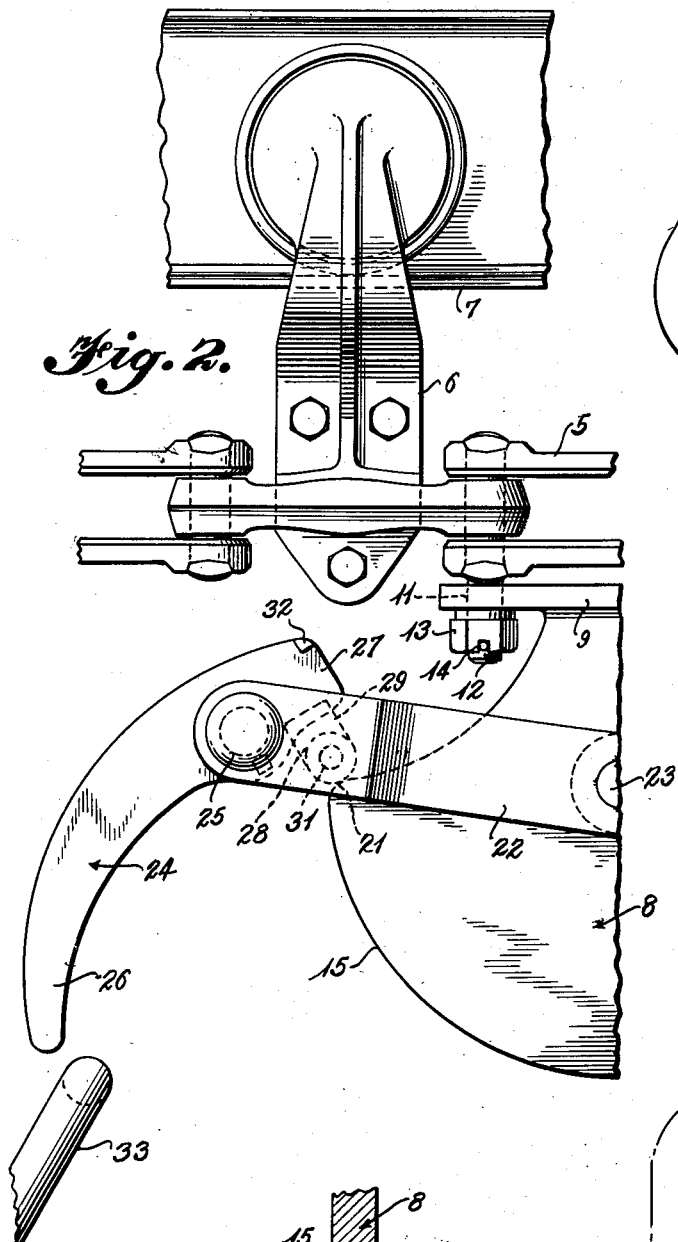
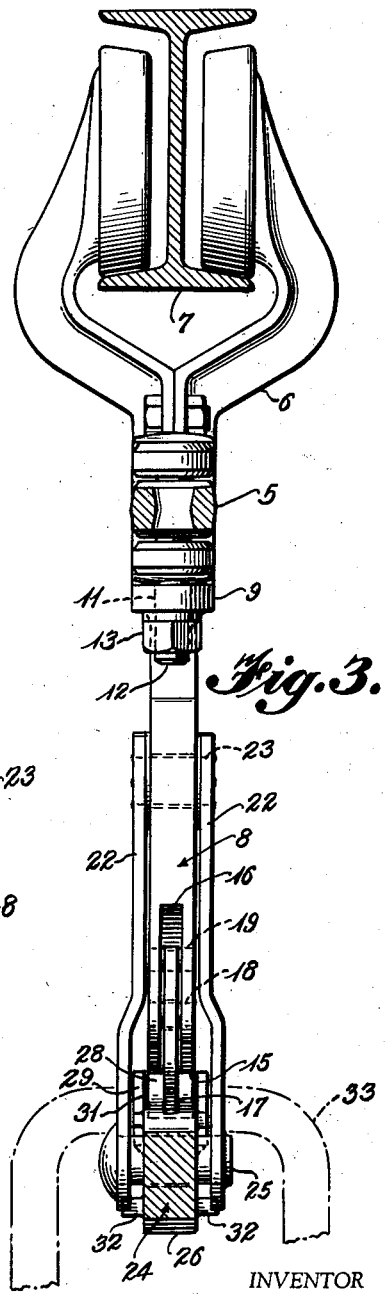
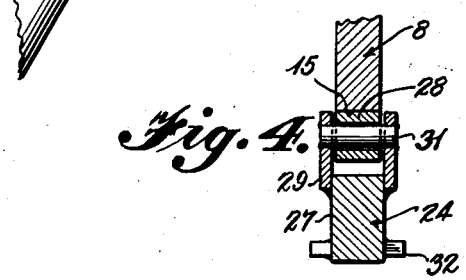
INVENTOR
Hubert J. McCormick
BY
ATTORNEY

UNITED STATES PATENT OFFICE 2,644,407

QUICK-RELEASE OVERHEAD TROLLEY CONVEYER HOOK

Hubert J. McCormick, Chicago, Ill., assignor to Link-Belt Company, a corporation of Illinois Application August 10, 1950, Serial No. 178,669

10 Claims. (Cl. 104—170)

This invention relates to new and useful improvements in hooks for overhead trolley conveyors, and deals more specifically with quick-release, overhead trolley conveyor hooks for use in moving tow trucks through freight docks, warehouses, or the like.

Overhead trolley conveyors have been widely and successfully used as motivating devices for tow trucks carrying freight, or other objects. In installations of this type, the endless overhead conveyor is provided with hooks, or other coupling devices, at spaced intervals along its length to which the mating coupling devices on the tow trucks are attached. Connecting and disconnecting the tow trucks relative to the conveyor ordinarily is accomplished manually so that the loaded trucks may be moved between any of several stations along the path of the conveyor.

It readily will be understood that connecting the tow trucks to the conveyor may be accomplished with relatively little difficulty by moving the draft members of the trucks into coupling position and permitting movement of the conveyor to complete the coupling operation. In the past, however, considerable difficulty has been encountered, particularly when the trucks are heavily loaded, in disconnecting them from the conveyor. This has been due, primarily, to the fact that it has been necessary to move the trucks manually at a greater speed than that of the conveyor to disconnect the draft members of the trucks from the hooks of the conveyor.

It is the primary object of this invention to provide a quick-release overhead trolley conveyor hook from which a tow truck draft member, such as a tow mast, may be readily detached without requiring forward movement of the draft member relative to its point of connection with the conveyor.

A further object of the invention is to provide a quick-release, overhead trolley conveyor hook which may be actuated to effect release of a coupled tow truck by moving the coupled end of the truck draft member upwardly and rearwardly relative to the direction of travel of the conveyor.

Another difficulty encountered with the use of prior overhead trolley conveyor hooks, particularly when the tow trucks are equipped with rigid tow masts, is the tendency for the masts to be disconnected from the conveyor hooks as a result of hunting or overrunning of the trucks relative to the conveyor chain. In other words, the speed of the chain being constant, various conditions at various points along the path of the conveyor may cause a temporary increase in the speed of the trucks to disconnect the masts from the hooks. Prior attempts to overcome this difficulty, by equipping the conveyor hooks with keepers, have only increased the previously referred to difficulty encountered in effecting uncoupling of heavily loaded trucks.

Another important object of the invention is the provision of a quick-release, overhead trolley conveyor hook of the above mentioned type which is equipped with a keeper that will prevent the tow mast of a truck from becoming disconnected when the truck hunts or overruns the conveyor.

Other objects and advantages of the invention will be apparent during the course of the following description.

In the accompanying drawings forming a part of this specification and in which like reference characters are employed to designate like parts throughout the same, Figure 1 is a side elevational view of the quick-release overhead trolley conveyor hook embodying the invention with the complimentary eye of a truck tow mast coupled thereto.

Figure 2 is a side elevational view, partly broken away, showing the hook of Fig. 1 in its open or releasing position, Figure 3 is a vertical sectional view taken on lines 3—3 of Fig. 1, and Figure 4 is a detail sectional view taken on line 4—4 of Fig. 1.

In the drawings, wherein for the purpose of illustration is shown the preferred embodiment of this invention, reference character 5 designates an overhead conveyor chain attached to the wheel trolley 6 supported for travel along the rail 7.

Referring now to Figs. 1 and 3 for a detail description of the quick-release hook embodying the invention, the shank 8 thereof is provided with a connecting plate 9 which is welded or similarly connected to its upper end. The opposite end portions of the plate 9 are provided with openings 11 for receiving the extended pins 12 of the conveyor chain 5 and nuts 13, locked in place by cotters 14, are threaded onto the extended pins to secure the plate to the chain.

The lower portion of the shank 8 is provided with an arcuate camming surface 15 having a groove 16 formed in the lower, forward corner portion thereof. A keeper 17 is pivotally mounted in the groove 16 by the pin 18 and a second pin 19 engages the upper end portion of the keeper to prevent forward movement of its lower end portion.

The arcuate camming surface 15 may have either a constant or a variable radius of curvature and may be of varying length, as will be further described later. The trailing edge portion of the camming surface 15 is provided with a release point 21 at which the camming surface makes a sharp reverse curve toward the front of the shank.

A pair of side bars 22 is pivotally mounted on the shank 8 by the pin 23 and depends downwardly therefrom to a point below the camming surface 15. These side bars 22 are offset to increase the space between their free lower end portions.

A dog 24 is pivotally mounted between the free end portions of the side bars 22 by the pin 25. The dog 24 is formed with a forwardly extending end portion 26 and a lever portion 27 extending rearwardly from the pin 25.

As illustrated in Fig. 4, a follower roll 28 is rotatably mounted on the lever portion 27 by the posts 29 and the pin 31 for engaging the camming surface 15. A stop lug 32 extends laterally from each side of the lever portion 27.

Referring now to Figs. 1 and 2 for a description of the operation of the quick-release hook, it will be appreciated that the free pivotal movement at the pins 23 and 25 will permit the weight of the dog 24 and the side bars 22 to effect their movement to substantially the position illustrated by the full-lines in Fig. 1. While in this position, the eye 33 of a truck tow mast 34 readily may be passed over the projecting end portion 26 of the dog 24.

Movement of the eye 33 along the portion 26 toward the pin 25 will cause the keeper 17 to pivot inwardly allowing the eye to pass between the portion 26 and the keeper 17. After passing the keeper 17, the eye 33 will be prevented from moving forwardly off of the portion 26 by the stop pin 19 which limits pivotal movement of the keeper 17 in a forward direction.

Engagement of the follower 28 with the camming surface 15 will act through the lever portion 27 of the dog 24 to prevent pivotal movement of the dog relative to the side bars 22. The eye 33, therefore, is securely held in position on the portion 26 so that continuous movement of the chain 5 will apply a motivating force through the eye 33 and the tow mast 34 to a tow truck or similar device, not shown.

The motivating force applied by the chain 5 to the tow truck is transmitted through the mast 34 so that the mast will seek the angular or inclined position illustrated by the broken-lines of Fig. 1, in which the axis of the mast, if extended, would pass substantially through the axis of the pivotal connection at the pin 23. In moving to this position, the tow mast effects pivotal movement of the side bars 22 relative to the shank 8. The relative positions of the dog 24 and side bars 22, however, will remain substantially constant due to the engagement of the follower 28 with the camming surface 15 to prevent pivotal movement of the dog relative to the side bars.

It will be appreciated that controlled pivotal movement of the dog 24 relative to the side bars 22 might be effected by varying the radius of curvature of the camming surface 15 without materially affecting the operation of the hook device.

After the travel of the chain 5 has effected movement of the tow truck to its desired location, the eye 33 of the tow mast 34 is disengaged from the dog 24 in the following manner:

The tow mast 34 is moved manually toward its vertical position, or to cause the eye 33 to move upwardly and rearwardly, to effect further pivotal movement of the side bars 22 and dog 24 relative to the shank 8 whereby the follower 28 approaches the release point 21 of the camming surface. The length of the camming surface 15 may be varied to require greater or lesser pivotal movement of the side bars 22 and dog 24 to move the follower 28 to the release point 21 at the trailing end portion of the camming surface.

As illustrated in Fig. 2, movement of the follower 28 beyond the release point 21 will permit pivotal movement of the dog 24 relative to the side bars 22. This relative pivotal movement between the dog 24 and side bars 22 permits the dog to assume an angle relative to the tow mast 34 at which the eye 33 may be readily removed from the dog 24. The lugs 32, however, will engage the side bars 22 to prevent pivotal movement of the dog relative to the side bars to such an extent that the position of the dog would be reversed with respect to the shank 8.

When the eye 33 has been completely disengaged from the hook portion 26, the weight of the dog 24 and the side bars 22 will effect return of these parts to the position illustrated in full-lines in Fig. 1.

It is to be understood that the form of this invention herewith shown and described is to be taken as the preferred example of the same, and that various changes in the shape, size and arrangement of parts may be resorted to without departing from the spirit of the invention or the scope of the subjoined claims.

Having thus described the invention, I claim:

1. A quick-release hook, comprising a shank having a camming surface, connecting means pivotally mounted on said shank, a dog pivotally mounted on said connecting means, and follower means mounted on said dog for movement along the camming surface to control the pivotal movement of the dog relative to the connecting means, pivotal movement of said connecting means relative to said shank effecting the said movement of the follower means along the camming surface.

2. A quick-release hook for engaging the eye of a towing mast, comprising a shank having a camming surface, a pair of side bars pivotally mounted on the opposite sides of said shank, a dog pivotally mounted on said side bars and having an end portion adapted to pass through the eye of a towing mast, and a follower mounted on said dog for movement along the camming surface to control the pivotal movement of the dog relative to the side bars, movement of the eye of the towing mast effecting pivotal movement of said side bars relative to said shank to cause the said movement of the follower along the camming surface.

3. A quick-release hook, comprising a shank having a camming surface, a pair of side bars pivotally mounted on the opposite sides of said shank and having their free end portions extending beyond said camming surface, a dog mounted between the free end portions of said side bars and pivotally connected thereto, and a follower mounted on said dog for engagement with said camming surface, pivotal movement of said side bars effecting movement of said follower along said camming surface to control the position of said dog relative to said side bars.

4. A quick-release hook, comprising a shank adapted to be connected to a trolley conveyor chain, said shank having a camming surface, connecting means pivotally mounted on said shank and extending beyond said camming surface, a dog pivotally mounted on the end portion of said connecting means which extends beyond said camming surface, and means mounted on said dog for engagement with said camming surface, movement of said last mentioned means along said camming surface being operative to modify the position of said dog relative to said connecting means.

5. A quick-release hook, comprising a shank adapted to be connected to a trolley conveyor chain, connecting means pivotally mounted on said shank, said shank having a camming surface at a varying radial distance from the pivotal mounting of said connecting means, a dog pivotally mounted on said connecting means, and follower means mounted on said dog at a spaced location from the pivotal mounting of the latter for engagement with said camming surface, movement of said follower means along said camming surface to various radial distances from the pivotal mounting of said connecting means being operative to vary the angle between said dog and said connecting means.

6. A quick-release hook, comprising a shank adapted to be connected to a trolley conveyor chain, a pair of side bars pivotally mounted on the opposite sides of said shank, said shank having a camming surface at a varying radial distance from the pivotal mounting of said side bars, a dog pivotally connected to said side bars and having an end portion extending in one direction from said pivotal connection and a lever portion extending in substantially the opposite direction from said pivotal connection, and means mounted on said lever portion for engaging said camming surface to vary the angle between the dog and side bars when the last mentioned means is moved along the camming surface.

7. A quick-release hook, comprising a shank adapted to be connected to a trolley conveyor chain, a pair of side bars pivotally mounted on the opposite sides of said shank, said shank having a camming surface at a varying radial distance from the pivotal mounting of said side bars, a dog pivotally connected to said side bars and having an end portion extending in one direction and a lever portion extending in substantially the opposite direction from the pivotal connection, said hook and lever portions being in spaced relationship with said camming surface, a follower mounted on said lever portion and engaging said camming surface to vary the angle between said dog and said side bars when the follower is moved along the camming surface, and keeper means mounted on said shank for movement in opposite directions to open and close the space between the shank and the end portion of the dog.

8. A quick-release hook comprising a shank adapted to be connected to a trolley conveyor chain, said shank having a camming surface, a pair of side bars pivotally mounted on the opposite sides of said shank, a dog pivotally mounted on said side bars and having an end portion and a lever portion extending in opposite directions along and in spaced relationship with said camming surface, and a follower mounted on said lever portion for engaging said camming surface during pivotal movement of said side bars through a given angle from their vertical position toward a horizontal position, movement of said side bars beyond said given angle effecting movement of the follower beyond the camming surface to release said dog for pivotal movement relative to the side bars.

9. A quick-release hook for engaging the eye of a towing mast, comprising a shank adapted to be connected to a trolley conveyor chain, said shank having a camming surface, a pair of side bars pivotally mounted on the opposite sides of said shank, a dog pivotally mounted on said side bars and having an end portion and a lever portion extending in opposite directions along and in spaced relationship with said camming surface, said end portion being adapted to engage and support the eye of a towing mast in the space between said portion and the camming surface, and a follower mounted on said lever portion between the latter and the camming surface and normally engaging the camming surface to prevent pivotal movement of said dog relative to said side bars, movement of the eye of the towing mast effecting pivotal movement of said side bars relative to the shank whereby said follower is movable past the camming surface to release said dog for pivotal movement relative to the side bars.

10. A quick-release hook for engaging the eye of a towing mast, comprising a shank adapted to be connected to a trolley conveyor chain, said shank having a camming surface, a pair of side bars pivotally mounted on the opposite sides of said shank, a dog pivotally mounted on said side bars and having an end portion and a lever portion extending in opposite directions along and in spaced relationship with said camming surface, said hook portion being adapted to engage and support the eye of a towing mast in the space between said portion and the camming surface, a follower mounted on said lever portion between the latter and the camming surface and normally engaging the camming surface to prevent pivotal movement of said dog relative to said side bars, and a keeper pivotally mounted on said shank and movable between a substantially vertical position closing the space between the end portion of the dog and the camming surface and an inclined position permitting free passage for the eye of the towing mast into the space between said end portion and the camming surface, movement of the eye of the towing mast while engaging said dog effecting pivotal movement of said side bars relative to the shank whereby said follower is movable past the camming surface to release said dog for pivotal movement relative to the side bars.

HUBERT J. McCORMICK.

References Cited in the file of this patent

UNITED STATES PATENTS

| Number | Name | Date |
|---|---|---|
| 125,900 | Miles | Apr. 23, 1872 |
| 997,438 | Clough | July 11, 1911 |
| 1,030,586 | Irwin | June 25, 1912 |
| 1,994,646 | Heath | Mar. 19, 1935 |